United States Patent
Kuo et al.

(10) Patent No.: US 7,684,925 B2
(45) Date of Patent: *Mar. 23, 2010

(54) ENGINE WARM-UP OF A HOMOGENEOUS CHARGE COMPRESSION IGNITION ENGINE

(75) Inventors: Tang-Wei Kuo, Troy, MI (US); Paul M. Najt, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 187 days.

This patent is subject to a terminal disclaimer.

(21) Appl. No.: 11/941,200

(22) Filed: Nov. 16, 2007

(65) Prior Publication Data

US 2008/0140300 A1 Jun. 12, 2008

Related U.S. Application Data

(60) Provisional application No. 60/868,967, filed on Dec. 7, 2006.

(51) Int. Cl.
*F02D 45/00* (2006.01)
*G06F 19/00* (2006.01)

(52) U.S. Cl. .................................... 701/113
(58) Field of Classification Search ............. 701/113, 701/102; 123/90.15–90.17, 299, 300, 305, 123/179.5, 179.15
See application file for complete search history.

(56) References Cited

U.S. PATENT DOCUMENTS

| 4,324,210 | A * | 4/1982 | Aoyama | 123/90.16 |
|---|---|---|---|---|
| 6,386,177 | B2 | 5/2002 | Urushihara et al. | |
| 6,899,077 | B2 * | 5/2005 | Wagner et al. | 123/305 |
| 6,971,365 | B1 | 12/2005 | Najt et al. | |
| 6,990,937 | B2 * | 1/2006 | Shindou et al. | 123/90.15 |
| 6,994,072 | B2 | 2/2006 | Kuo et al. | |
| 7,059,281 | B2 | 6/2006 | Kuo et al. | |
| 7,171,953 | B2 * | 2/2007 | Altenschmidt | 123/299 |
| 2006/0016420 | A1 | 1/2006 | Kuo et al. | |
| 2006/0016423 | A1 | 1/2006 | Kuo et al. | |

FOREIGN PATENT DOCUMENTS

JP 2002-195060 A * 7/2002

* cited by examiner

*Primary Examiner*—Hieu T Vo

(57) ABSTRACT

Cold start and warm-up operations of an HCCI engine are improved through coordinated control of engine valves, fuel injection and spark timing.

18 Claims, 3 Drawing Sheets

ENGINE WARM-UP OF A HOMOGENEOUS CHARGE COMPRESSION IGNITION ENGINE

CROSS REFERENCE TO RELATED APPLICATIONS

This application claims the benefit of U.S. Provisional Application No. 60/868,967 filed on Dec. 7, 2006 which is hereby incorporated herein by reference.

TECHNICAL FIELD

This disclosure pertains generally to internal combustion engine control systems.

BACKGROUND

The statements in this section merely provide background information related to the present disclosure and may not constitute prior art.

One engine system being developed for controlled auto-ignition combustion operation comprises an internal combustion engine designed to operate under an Otto cycle. The engine, equipped with direct in-cylinder fuel-injection, operates in a controlled auto-ignition mode under specific engine operating conditions to achieve improved engine fuel efficiency. A spark ignition system is employed to supplement the auto-ignition combustion process during specific operating conditions. Such engines are referred to as Homogeneous Charge Compression Ignition (hereinafter 'HCCI') engines.

An HCCI engine operating in HCCI combustion mode creates a charge mixture of combusted gases, air, and fuel in a combustion chamber, and auto-ignition is initiated simultaneously from many ignition sites within the charge mixture during a compression stroke, resulting in stable power output, high thermal efficiency and low emissions. The combustion is highly diluted and uniformly distributed throughout the charge mixture, resulting in low burnt gas temperature and NOx emissions typically substantially lower than NOx emissions of either a traditional spark ignition engine, or a traditional diesel engine.

HCCI has been demonstrated in two-stroke gasoline engines using conventional compression ratios. It is believed that the high proportion of burnt gases remaining from the previous cycle, i.e., the residual content, within the two-stroke engine combustion chamber is responsible for providing the high mixture temperature necessary to promote auto-ignition in a highly diluted mixture.

In four-stroke engines with traditional valve means, the residual content is low and HCCI at part load is difficult to achieve. Known methods to induce HCCI at low and part loads include: 1) intake air heating, 2) variable compression ratio, and 3) blending gasoline with ignition promoters to create a more easily ignitable mixture than gasoline. In all the above methods, the range of engine speeds and loads in which HCCI can be achieved is relatively narrow. Extended range HCCI has been demonstrated in four-stroke gasoline engines using variable valve actuation with certain valve control strategies that effect a high proportion of residual combustion products from previous combustion cycle necessary for HCCI in a highly diluted mixture. With such valve strategies, the range of engine speeds and loads in which HCCI can be achieved is greatly expanded using a conventional compression ratio. One such valve strategy includes trapping and recompression of exhaust gases by early closure of the exhaust valve during the exhaust stroke and low valve lift. Such valve control can be implemented using variable cam phasers and two-step lift cams.

Whereas the above-mentioned HCCI engine operating strategies are based upon extensive steady-state tests under fully warmed-up engine operating conditions, cold starting and engine warm-up operation pose some additional challenges. Operation in HCCI mode, including controlled auto-ignition of a fuel air mixture, is highly dependent on achieving a particular charge pressure and temperature at a given crankshaft position. Cold engine conditions adversely impact the ability of the charge to auto-ignite, inhibiting HCCI operation. While the applicant has successfully demonstrated improvements to cold start (ambient) operations by employing specially designed combustion chambers including piston bowls and component (e.g. injector and spark plug) arrangements, transition from ambient to fully warmed-up operation while maintaining robust HCCI engine operation and management of the exhaust aftertreatment systems is challenging.

SUMMARY

A method of operating a four-stroke internal combustion engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of the piston, a direct injection fuel system and a spark ignition system includes, during engine cranking at cold start conditions within a predetermined engine temperature range and for a duration thereafter until a predetermined engine temperature, operating the engine in a spark-assist start mode including: controlling the intake and exhaust valves to effect a partial-lift, negative valve overlap in a range of about 180 to about 200 crank angle degrees, controlling the fuel system to deliver a first injection of fuel during the negative valve overlap and a second injection of fuel during the compression stroke of the piston, and controlling the spark ignition system to effect spark-assisted ignition.

BRIEF DESCRIPTION OF THE DRAWINGS

One or more embodiments will now be described, by way of example, with reference to the accompanying drawings, in which:

FIG. 2A is a graphical depiction of a spark-assisted start mode in HCCI operation;

FIG. 2B is a graphical depiction of a warm-up mode in HCCI operation;

FIG. 3A is a graphical depiction of a cold start mode in SI operation;

FIG. 3B is a graphical depiction of a warm-up mode in HCCI operation;

FIG. 4A is a graphical depiction of a crank and fire start mode in SI operation;

FIG. 4B is a graphical depiction of a catalyst heating mode in SI operation; and FIG. 4C is a graphical depiction of a warm-up mode in HCCI operation.

DETAILED DESCRIPTION

Figure 1:
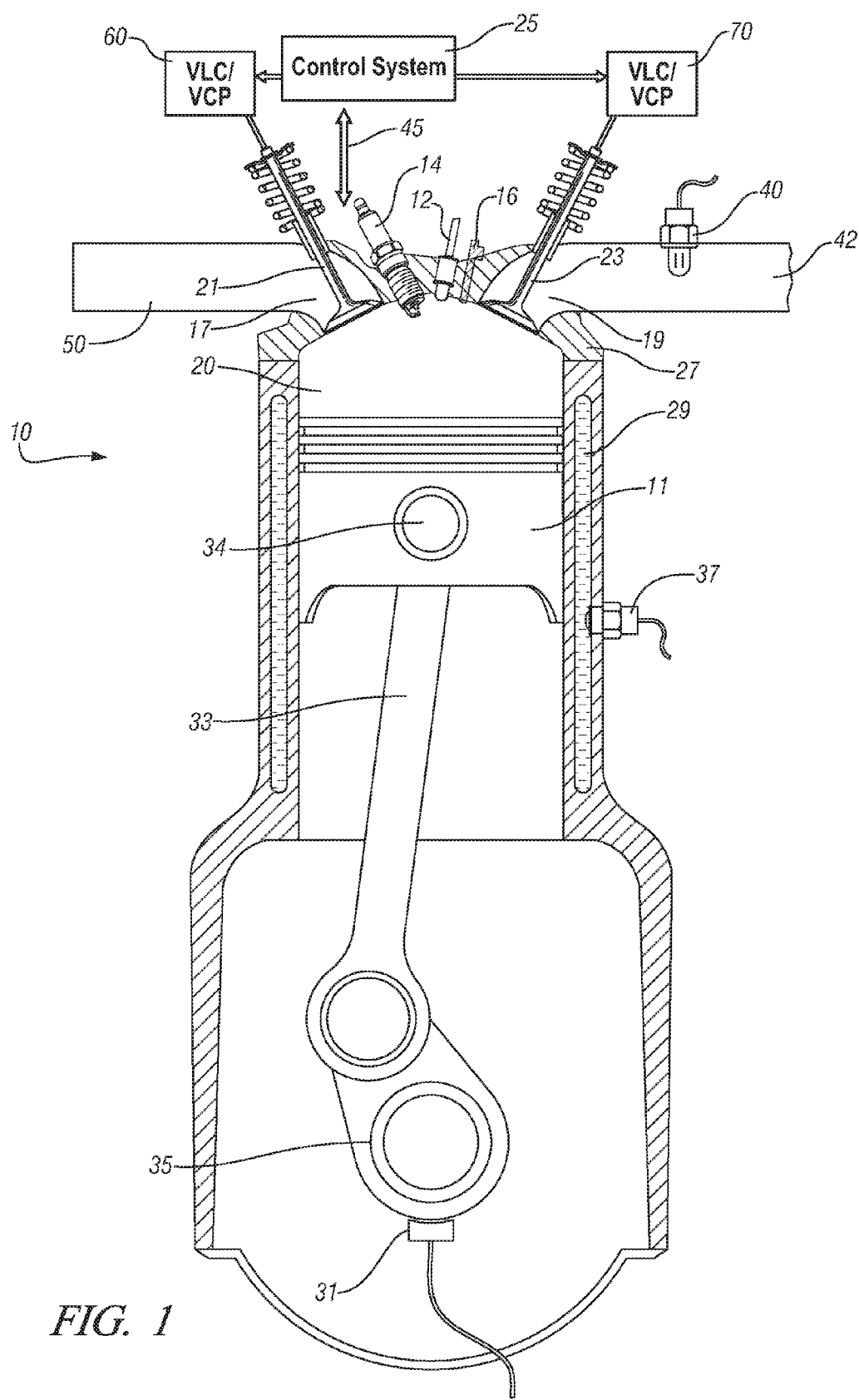
FIG. 1 is a schematic illustration of an exemplary internal combustion engine adapted for HCCI and SI operating modes in accordance with the present disclosure.

Referring now to the drawings, wherein the showings are for the purpose of illustrating certain exemplary embodiments only and not for the purpose of limiting the same, FIG. 1 shows a schematic of an internal combustion engine 10 and control system 25 which has been constructed in accordance with an embodiment of the present disclosure. The embodiment as shown is applied as part of an overall control scheme to operate an exemplary multi-cylinder, spark ignition, direct-injection, gasoline, four-stroke internal combustion engine adapted to operate under a controlled auto-ignition process, also referred to as homogenous-charge, compression-ignition ('HCCI') mode.

The exemplary engine 10 comprises: a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a parametric signal input to the control system 25 useable to control the engine. The engine preferably includes known systems including an external exhaust gas recirculation ('EGR') valve and an intake air throttle valve (not shown).

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 comprises a device signally connected to the control system 25 and operative to control timing, duration, and magnitude of opening and closing of each valve, either in concert or individually. The first embodiment of the exemplary engine comprises a dual overhead cam system which has variable lift control ('VLC') and variable cam phasing ('VCP'). The VCP device is operative to control timing of opening or closing of each intake valve and each exhaust valve relative to rotational position of the crankshaft and opens each valve for a fixed crank angle duration. Exemplary VCP devices include well known cam phasers. The exemplary VLC device is operative to control magnitude of valve lift to one of two positions: one position to 3-5 mm lift for an open duration of 120-150 crank angle degrees, and another position to 9-12 mm lift for an open duration of 220-260 crank angle degrees. Exemplary VLC devices include well known two-step lift cams. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensors 40 can comprise any of several known sensing devices operative to provide parametric values for the exhaust gas feedstream, including air/fuel ratio, or measurement of exhaust gas constituents, e.g. NOx, CO, HC, and others. The system may include an in-cylinder sensor 16 for monitoring combustion pressures, or non-intrusive pressure sensors or inferentially determined pressure determination (e.g. through crankshaft accelerations). The aforementioned sensors and metering devices each provide a signal as a parametric input to the control system 25. These parametric inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and driveability. The control system 25 is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system 25 is operably connected to the engine 10, and functions to acquire parametric data from sensors, and control a variety of actuators of the engine 10 over appropriate interfaces 45. The control system 25 receives an engine torque command, and generates a desired torque output, based upon the operator inputs. Exemplary engine operating parameters that are sensed by control system 25 using the aforementioned sensors include engine coolant temperature, crankshaft rotational speed ('RPM') and position, manifold absolute pressure, ambient air flow and temperature, and, ambient air pressure. Combustion performance measurements typically comprise measured and inferred combustion parameters, including air/fuel ratio, location of peak combustion pressure, among others.

Actuators controlled by the control system 25 include: fuel injectors 12; the VCP/VLC valve actuation devices 60, 70; spark plug 14 operably connected to ignition modules for controlling spark dwell and timing; exhaust gas recirculation (EGR) valve (not shown), and, electronic throttle control module (not shown). Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in a purely HCCI mode, the engine does not utilize an energized spark plug. However, it has proven desirable to employ spark ignition to complement the HCCI mode under certain conditions, including, e.g. during cold start, to prevent fouling and, in accordance with certain aspects of the present disclosure at low load operating conditions near a low-load limit. Also, it has proven preferable to employ spark ignition at a high load operation limit in the HCCI mode, and at high speed/load operating conditions under throttled or un-throttled spark-ignition operation.

The control system 25 preferably comprises a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for engine control are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event or interrupt request.

As mentioned above, operation in HCCI mode is preferred to operation in SI mode when operating conditions allow HCCI mode due to benefits such as efficient combustion, fuel economy, and emissions. However, cold engine conditions associated with cold starts and the resulting cold temperature of the charge interfere with the controlled auto-ignition required for normal HCCI operation. A number of methods are disclosed in order to compensate for cold engine conditions. Methods described utilize measures to facilitate combustion for a colder than normal charge, monitor engine temperature, for example through the temperature of the engine coolant, and automatically transition to normal HCCI mode when the engine temperature reaches a threshold value indicating that normal HCCI mode is possible. The various methods disclosed herein may be utilized in isolation or as part of an overall vehicle cold start strategy, the method utilized depending on a measured temperature at start up. Such a cold start strategy can select the method to be used based upon the anticipated difficulty of the start-up cycle: methods employing more fuel efficient and emissions friendly engine settings for easier starts and more effective or power-consuming engine settings for more difficult starts.

A first method operates similarly to normal HCCI mode, operating throughout a warm-up period at the limits of HCCI operation with large to maximum NVO and double injection in order to impart as much heat to the combustion charge as possible. In distinction, however, the first method also adds a spark-assist to insure combustion even if the charge is too cold to undergo stable auto-ignition. This first method is most useful in conditions close to but not within normal HCCI operation, maintaining some of the benefits of normal HCCI operation while stabilizing the combustion process.

A second method acts more aggressively than the first, utilizing SI mode briefly for a start-up operation before switching to a spark-assisted HCCI mode for the remainder of the warm-up period. The SI mode employed for the start-up in this method gains the stability advantages associated in the art with standard ignition while maintaining comparatively fuel efficient valve timing and lift settings associated with HCCI mode. As operation in SI mode continues, the engine temperature passes some critical level, above which cold HCCI or spark-assisted HCCI is possible. The second method then transitions to spark-assisted HCCI throughout the remainder of the warm-up period. This second method is useful in cold engine conditions when the charge will be too cold to approach HCCI operation until some time of SI operation has passed; however, the low valve operation utilized in this method moderates the impact upon engine characteristics such as fuel efficiency and emissions that switching to high valve SI mode would incur.

A third method acts more aggressively than either of the first two methods, utilizing a fully open valve "crank and fire" SI mode to start the engine, transitions to an SI catalyst heating mode. This fully open valve SI mode takes full advantage of the ability of the engine to start under normal combustion conditions in order to overcome the coldest start conditions. No benefits associated with HCCI operation are realized in this fully open SI mode. The third method, once engine start has been achieved, moderates slightly the fully open valve SI mode to an SI catalyst heating mode in order to bring an exhaust treatment device in the exhaust system up to operating temperature. Finally, after the engine and the exhaust treatment device are brought past a critical temperature, the third method transitions to a cold HCCI mode similar to the cold HCCI modes of the first two methods for the remainder of the warm-up period. The disclosure is not intended to be limited to the specific methods described herein: many permutations to the overall approach are envisioned. Various methods, their implementation, and benefits will become apparent throughout the disclosure herein.

Figure 2A:
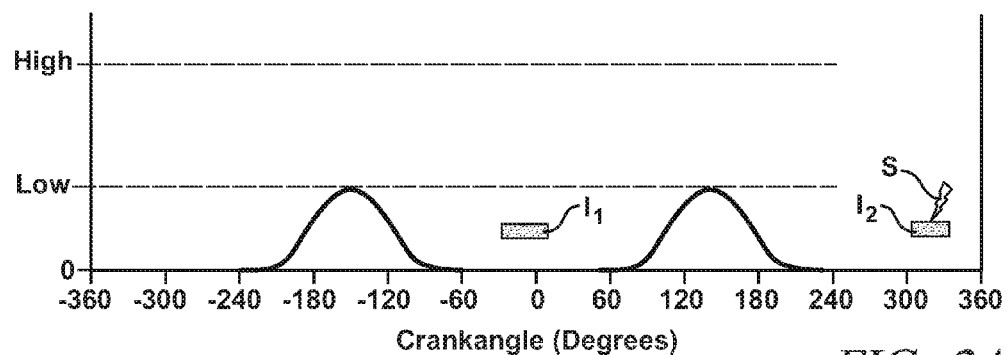
FIGS. 2A and 2B illustrate coordinated valve, fueling and spark control employed in effecting spark-assisted start and warm-up operating modes in accordance with a first exemplary method of the present disclosure.
Figure 2B:
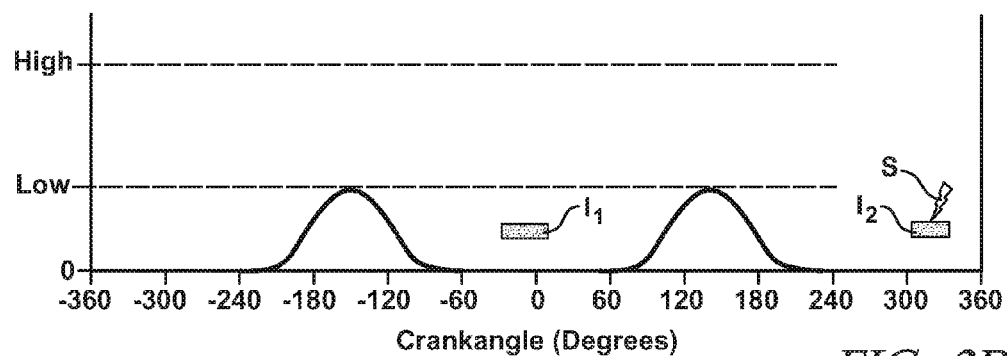

With reference now to FIGS. 2A and 2B, an illustration is given of a coordinated valve, fueling and spark control employed in effecting the cold start and warm-up operating modes in accordance with a first exemplary method of the present disclosure. Each of FIGS. 2A and 2B illustrates along a horizontal axis engine crankangle with a reference at zero corresponding to top dead center (TDC) between the exhaust and intake strokes of the piston. Intake and exhaust valve lift is represented by the vertical axis and generally includes low and high lift points as illustrated corresponding to the low and high lift cam lifts that are enabled by exemplary two-step lift cams in an exemplary hardware embodiment.

Start-up engine operation in a spark-assisted HCCI mode or a spark-assist cold start mode is shown in FIG. 2A using low lift cams with split injection during engine cranking, and such operation is continued throughout the warm-up period, transitioning to traditional HCCI operation when the engine temperature exceeds a predetermined threshold value indicative of engine conditions conducive to such HCCI operation. FIG. 2B illustrates a transition from cold start operation in spark-assisted HCCI mode to warm-up operation in spark-assisted HCCI mode. The engine settings in these two stages of operation represented by FIGS. 2A and 2B may be identical in some embodiments, or the engine settings in cold start operation as compared to engine settings in warm-up operation may be slightly more aggressive in some exemplary embodiments in terms of longer NVO (for example, around 200 crank angle degrees for start-up operation, as compared to 180 crank angle degrees for warm-up operation), a higher mass ratio of the first injection to the second injection (up to 50%, as compared to around 20% in warm-up operation), and small adjustments to injection and spark timing. There may also be a transition from nearly stoichiometric fuel air ratio in cold start operation to a lean fuel air ratio in warm-up operation. These transitions are keyed to engine temperature, for instance as measured by coolant temperature, and may occur in a step fashion or may be gradually phased in as a function of engine temperature. During cold start and warm-up operation, as shown respectively in FIGS. 2A and 2B, the engine is operated with a stoichiometric to lean air/fuel ratio, with reduced lift and duration valve events as described herein above with respect to low lift cams, maximum to large NVO at or close to the NVO limits of the VCP, and split injection with the first injection ($I_1$) taking place during NVO and the second injection ($I_2$) taking place late in the compression stroke. A preferred range for NVO during spark-assisted HCCI cold start and warm-up operation is about 180 to about 200 crankangle degrees. A preferred range for first fraction fuel delivery during spark-assisted HCCI cold start and warm-up operation is about −40 to about 20 crankangle degrees and for second fraction fuel delivery during spark-assisted HCCI cold start and warm-up operation is about 300 to about 350 crankangle degrees. A preferred range for spark delivery during spark-assisted HCCI cold start and warm-up operation is about 300 to about 350 crankangle degrees.

Figure 3A:
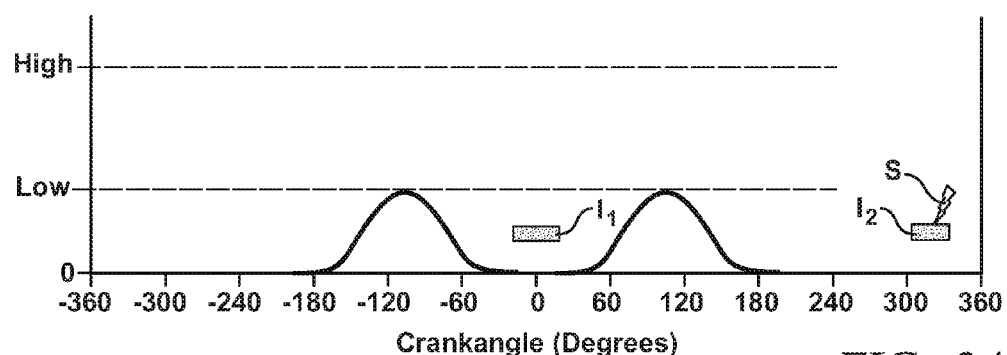
FIGS. 3A and 3B illustrate coordinated valve, fueling and spark control employed in effecting cold start and warm-up operating modes in accordance with a second exemplary method of the present disclosure.
Figure 3B:
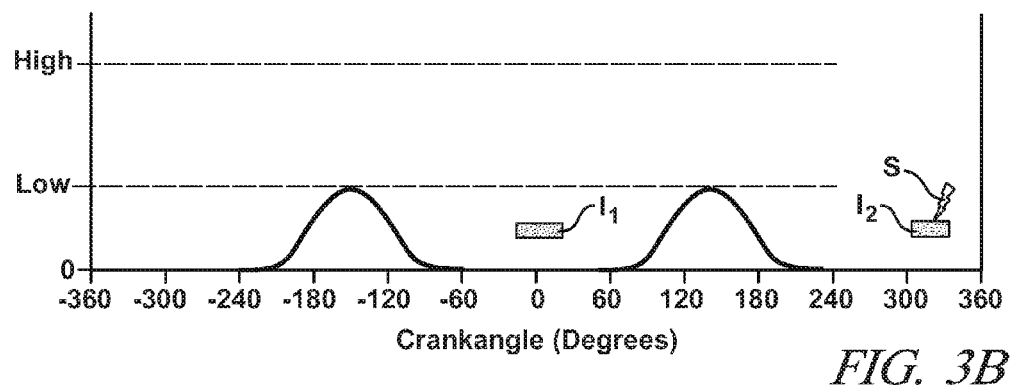

With reference now to FIGS. 3A and 3B, an illustration is given of a another coordinated valve, fueling and spark control employed in effecting the cold start and warm-up operating modes in accordance with a second exemplary method of the present disclosure. Each of FIGS. 3A and 3B illustrates along a horizontal axis engine crankangle with a reference at zero corresponding to top dead center (TDC) between the exhaust and intake strokes of the piston. Intake and exhaust valve lift is represented by the vertical axis and generally includes low and high lift points as illustrated corresponding to the low and high lift cam lifts that are enabled by the exemplary two-step lift cams of the exemplary hardware embodiment.

Start-up engine operation in SI mode or a cold start mode is shown in FIG. 3A using low lift cams with split injection with near stoichiometric air/fuel ratio for engine and catalyst warm-up. A switch over to cold HCCI mode (warm-up operation) is shown in FIG. 3B after the engine temperature, as measured for example by coolant temperature, reaches a predetermined critical temperature, for example 50 deg C. Subsequent to the warm-up operation, transitioning to traditional HCCI operation when the engine temperature exceeds a predetermined threshold value indicating engine conditions conducive to such HCCI operation is controlled. During the SI mode, the engine is operated with a near stoichiometric air/fuel ratio, modest to minimal NVO, and split injection with the first injection ($I_1$) taking place during NVO and the second injection ($I_2$) taking place late in the compression stroke. During the cold HCCI mode (warm-up operation), the engine is operated with a stoichiometric to lean air/fuel ratio, with reduced lift and duration valve events, maximum to large NVO, and split injection with the first injection taking place during NVO and the second injection taking place late in the compression stroke. Preferred ranges for NVO during SI mode cold start operation is about 0 to about 60 crankangle degrees and during warm-up operation is about 180 to about 200 crankangle degrees. A preferred range for first fraction fuel delivery during SI mode cold start operation is about 0 to about 60 crankangle degrees and for second fraction fuel delivery during SI mode cold start operation is about 300 to about 350 crankangle degrees. A preferred range for first fraction fuel delivery during warm-up operation is about −40 to about 20 crankangle degrees and for second fraction fuel delivery during warm-up operation is about 300 to about 350 crankangle degrees. A preferred range for spark delivery during SI mode cold start operation is about 310 to about 360 crankangle degrees and during warm-up operation is about 300 to about 350 crankangle degrees.

Figure 4A:
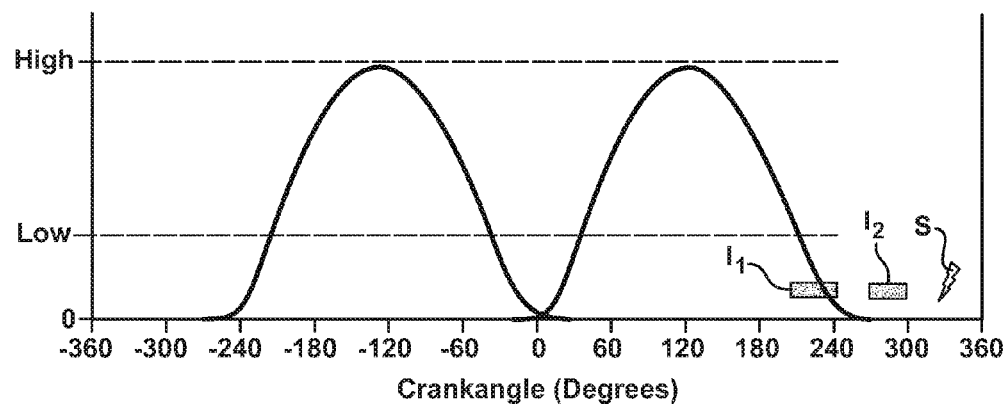
FIGS. 4A-4C illustrate coordinated valve, fueling and spark control employed in effecting crank and fire start and warm-up operating modes, including an intervening catalyst heating mode, in accordance with a third exemplary method of the present disclosure.
Figure 4B:
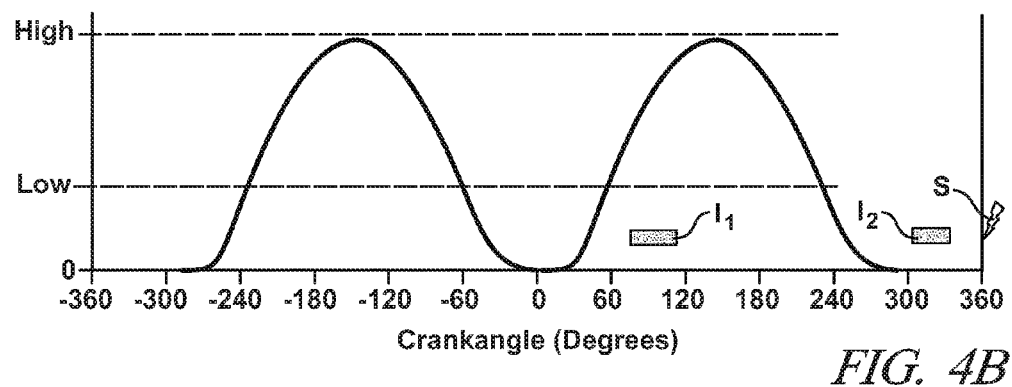
Figure 4C:
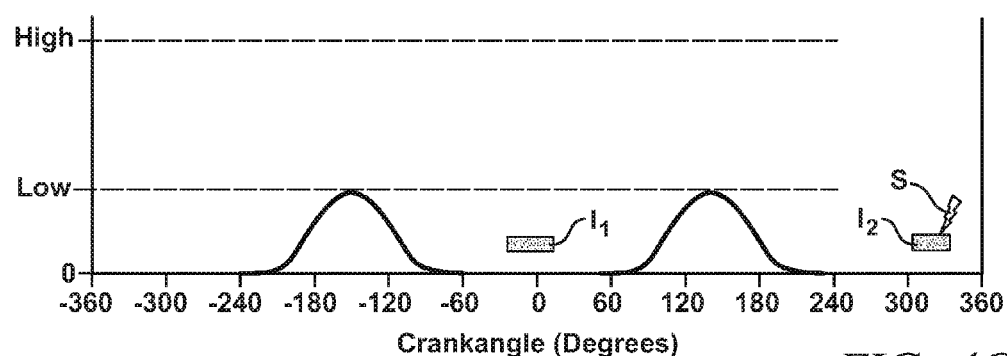

With reference now to FIGS. 4A-4C, an illustration is given of yet a another coordinated valve, fueling and spark control employed in effecting the cold start and warm-up operating modes, including an intervening exhaust treatment device heating mode, in accordance with a third exemplary method of the present disclosure. Each of FIGS. 4A, 4B and 4C illustrates along a horizontal axis engine crankangle with a reference at zero corresponding to top dead center (TDC) between the exhaust and intake strokes of the piston. Intake and exhaust valve lift is represented by the vertical axis and generally includes low and high lift points as illustrated corresponding to the low and high lift cam lifts that are enabled by the exemplary two-step lift cams of the exemplary hardware embodiment.

Start-up engine operation in SI mode using high lift cams with split injection or a crank and fire start mode is shown in FIG. 4A for one to several engine cycles during engine cranking until the engine starts up. Subsequently, a catalyst heating mode is shown in FIG. 4B using high lift cams. Then, a switch over to cold HCCI mode (warm-up operation) is shown in FIG. 4C, using low lift cams after the catalyst and engine reach respective threshold temperatures. Subsequent to the warm-up operation, transitioning to traditional HCCI operation when the engine temperature, for example as measured by coolant temperature, exceeds a predetermined threshold value indicative of engine conditions conducive to such HCCI operation is controlled. During start-up engine operation, the engine is operated with a near stoichiometric air/fuel ratio, full lift and duration valve events, minimum valve overlap, and single or split injection during the compression stroke. Subsequently, engine operation transitions to a catalyst heating mode where the air/fuel ratio is near stoichiometric, full lift and duration valve events are maintained, a modest level of NVO is introduced to minimize exhaust emissions, injection is split between the intake stroke ($I_1$) and the compression stroke ($I_2$) and spark timing is retarded, preferably after TDC combustion (360 degrees). This adjustment to the spark timing to some point after TDC is known in the art as a method to cause more of the heat of combustion to exit the combustion chamber through the exhaust gas. This extra heat in the exhaust gas acts to speed the heating of the exhaust treatment device. Once catalyst and engine reach respective critical temperatures, the engine is transitioned to the cold HCCI mode (warm-up operation), and operated with a stoichiometric to lean air/fuel ratio, reduced lift and duration valve events, maximum to large NVO, and split injection with the first injection ($I_1$) taking place during NVO and the second injection ($I_2$) taking place late in the compression stroke. Preferred ranges for NVO during SI mode cold start operation is about –40 to about 0 crankangle degrees, during catalyst heating operation is about 0 to about 40 crankangle degrees, and during warm-up operation is about 180 to about 200 crankangle degrees. Where split injection is practiced during cold start operation, a preferred range for first fraction fuel delivery during SI mode cold start operation is about 200 to about 240 crankangle degrees and for second fraction fuel delivery during SI mode cold start operation is about 270 to about 300 crankangle degrees. Otherwise, where a single injection is practiced during cold start operation, a preferred range for fuel delivery during SI mode cold start operation is about 240 to about 300 crankangle degrees. A preferred range for first fraction fuel delivery during catalyst heating operation is about 70 to about 110 crankangle degrees and for second fraction fuel during catalyst heating operation is about 300 to about 350 crankangle degrees. A preferred range for first fraction fuel delivery during warm-up operation is about –40 to about 20 crankangle degrees and for second fraction fuel during warm-up operation is about 300 to about 350 crankangle degrees. A preferred range for spark delivery during SI mode cold start operation is about 310 to about 0 crankangle degrees where split injection is practiced and about 310 to about 0 crankangle degrees where single injection is practiced. A preferred range for spark delivery during catalyst heating operation is about 360 to about –330 crankangle degrees. A preferred range for spark delivery during warm-up operation is about 300 to about 350 crankangle degrees.

As aforementioned, the above methods may be used in isolation or in any combination in a particular vehicle. Engine designs and calibrations are very complex and may vary greatly from application to application. For instance, for reasons having to do with an engine configuration in a particular vehicle, one application could skip the second method: if the starting temperature is below normal HCCI operation but above a threshold temperature, the first method is used; if the starting temperature is below the threshold temperature, the third method is used. Many strategies of implementation are envisioned, and the use of these methods is not intended to be limited to the embodiments and combinations described herein. Selection between various methods may be keyed to a single parameter such as engine temperature, for example as measured by coolant temperature, or selection may be a function of a number of variables touching on the viability HCCI combustion in cold engine conditions, such as engine temperature, fuel grade, and maintenance history such as time since last oil change.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method of operating a four-stroke internal combustion engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston, a direct injection fuel system and a spark ignition system, comprising:

during engine cranking at cold start conditions within a predetermined engine temperature range and for a duration thereafter until a predetermined engine temperature, operating said engine in a spark-assist start mode including:
controlling said intake and exhaust valves to effect a partial-lift, negative valve overlap in a range of about 180 to about 200 crank angle degrees;
controlling said fuel system to deliver a first injection of fuel during said negative valve overlap and a second injection of fuel during said compression stroke of said piston; and,
controlling said spark ignition system to effect spark ignition.

2. The method of claim 1, wherein said operating said engine in said spark-assist start mode warms said engine sufficiently such that subsequent engine operation is capable of homogeneous charge compression ignition operation without spark-assist.

3. The method of claim 1, further comprising:
during engine cranking at cold start conditions within a second predetermined engine temperature range colder than said predetermined engine temperature range, operating said engine in a cold start mode including:
controlling said intake and exhaust valves to effect a partial-lift, negative valve overlap in a range of about 0 to about 60 crank angle degrees;
controlling said fuel system to deliver a first injection of fuel during said negative valve overlap and a second injection of fuel during said compression stroke of said piston; and,
controlling said spark ignition system to effect spark ignition; and,
subsequent to operating engine in said cold start mode, operating said engine in a first warm-up mode including:
controlling said intake and exhaust valves to effect a partial-lift, negative valve overlap in a range of about 180 to 200 crank angle degrees,
controlling said fuel system to deliver a first injection of fuel during said negative valve overlap and a second injection of fuel during said compression stroke of said piston; and,
controlling said spark ignition system to effect spark ignition.

4. The method of claim 3, wherein said operating said engine in said first warm-up mode warms said engine sufficiently that subsequent engine operation is capable of homogeneous charge compression ignition operation without spark-assist.

5. The method of claim 3, further comprising:
during engine cranking at cold start conditions within a third predetermined engine temperature range colder than said second predetermined engine temperature range, operating said engine in a crank and fire start mode including:
controlling said intake and exhaust valves to effect a full-lift, minimum valve overlap of no greater than about 40 crank angle degrees;
controlling said fuel system to deliver one of a split and single injection of fuel during said compression stroke of said piston; and,
controlling said spark ignition system to effect spark ignition;
subsequent to operating said engine in said crank and fire start mode, operating said engine in a catalyst heating mode including:
controlling said intake and exhaust valves to effect a full-lift, negative valve overlap in a range of about 0 to about 40 crank angle degrees;
controlling said fuel system to deliver a first injection of fuel during said intake stroke of said piston and a second injection of fuel during said compression stroke of said piston; and,
controlling said spark ignition system to effect retarded spark ignition; and,
subsequent to operating said engine in said catalyst heating mode, operating said engine in a second warm-up mode including:
controlling said intake and exhaust valves to effect a partial-lift, negative valve overlap in a range of about 180 to about 200 crank angle degrees,
controlling said fuel system to deliver a first injection of fuel during said negative valve overlap and a second injection of fuel during said compression stroke of said piston; and,
controlling said spark ignition system to effect spark ignition.

6. The method of claim 5, wherein said operating said engine in said second warm-up mode warms said engine sufficiently that subsequent engine operation is capable of homogeneous charge compression ignition operation without spark-assist.

7. The method of claim 5, wherein said controlling said spark ignition system to effect retarded spark ignition effects post top dead center ignition.

8. The method of claim 1, further comprising:
during engine cranking at cold start conditions within a second predetermined engine temperature range colder than said predetermined engine temperature range, operating said engine in a crank and fire start mode including:
controlling said intake and exhaust valves to effect a full-lift, minimum valve overlap of no greater than about 40 crank angle degrees;
controlling said fuel system to deliver one of a split and single injection of fuel during said compression stroke of said piston; and,
controlling said spark ignition system to effect spark ignition;
subsequent to operating said engine in said crank and fire start mode, operating said engine in a catalyst heating mode including:
controlling said intake and exhaust valves to effect a full-lift, negative valve overlap in a range of about 0 to about 40 crank angle degrees;
controlling said fuel system to deliver a first injection of fuel during said intake stroke of said piston and a second injection of fuel during said compression stroke of said piston; and,
controlling said spark ignition system to effect retarded spark ignition; and,
subsequent to operating said engine in said catalyst heating mode, operating said engine in a warm-up mode including:
controlling said intake and exhaust valves to effect a partial-lift, negative valve overlap in a range of about 180 to about 200 crank angle degrees;
controlling said fuel system to deliver a first injection of fuel during said negative valve overlap and a second injection of fuel during said compression stroke of said piston; and,
controlling said spark ignition system to effect spark ignition.

9. The method of claim 8, wherein said operating said engine in said warm-up mode warms said engine sufficiently that subsequent engine operation is capable of homogeneous charge compression ignition operation without spark-assist.

10. The method of claim 8, wherein said controlling said spark ignition system to effect retarded spark ignition effects post top dead center ignition.

11. A method of operating a four-stroke internal combustion engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston, a direct injection fuel system and a spark ignition system, comprising:
during engine cranking at cold start conditions within a predetermined engine temperature range, operating said engine in a cold start mode including:
controlling said intake and exhaust valves to effect a partial-lift, negative valve overlap in a range of about 0 to about 60 crank angle degrees;
controlling said fuel system to deliver a first injection of fuel during said negative valve overlap and a second injection of fuel during said compression stroke of said piston; and,
controlling said spark ignition system to effect spark ignition; and,
subsequent to operating said engine in said cold start mode, operating said engine in a first warm-up mode including:
controlling said intake and exhaust valves to effect a partial-lift, negative valve overlap in a range of about 180 to about 200 crank angle degrees;
controlling said fuel system to deliver a first injection of fuel during said negative valve overlap and a second injection of fuel during said compression stroke of said piston; and,
controlling said spark ignition system to effect spark ignition.

12. The method of claim 11, wherein said operating said engine in said first warm-up mode warms said engine sufficiently that subsequent engine operation is capable of homogeneous charge compression ignition operation without spark-assist.

13. The method of claim 11, further comprising:
during engine cranking at cold start conditions within a second predetermined engine temperature range colder than said predetermined engine temperature range, operating said engine in a crank and fire start mode including:
  controlling said intake and exhaust valves to effect a full-lift, minimum valve overlap of no greater than about 40 crank angle degrees;
  controlling said fuel system to deliver one of a split and single injection of fuel during said compression stroke of said piston; and,
  controlling said spark ignition system to effect spark ignition;
subsequent to operating said engine in said crank and fire start mode, operating said engine in a catalyst heating mode including:
  controlling said intake and exhaust valves to effect a full-lift, negative valve overlap in a range of about 0 to about 40 crank angle degrees;
  controlling said fuel system to deliver a first injection of fuel during said intake stroke of said piston and a second injection of fuel during said compression stroke of said piston; and,
  controlling said spark ignition system to effect retarded spark ignition; and,
subsequent to operating said engine in said catalyst heating mode, operating said engine in a second warm-up mode including:
  controlling said intake and exhaust valves to effect a partial-lift, negative valve overlap in a range of about 180 to about 200 crank angle degrees;
  controlling said fuel system to deliver a first injection of fuel during said negative valve overlap and a second injection of fuel during said compression stroke of said piston; and,
  controlling said spark ignition system to effect spark ignition.

14. The method of claim 13, wherein said operating said engine in said second warm-up mode warms said engine sufficiently that subsequent engine operation is capable of homogeneous charge compression ignition operation without spark-assist.

15. The method of claim 13, wherein said controlling said spark ignition system to effect retarded spark ignition effects post top dead center ignition.

16. A method of operating a four-stroke internal combustion engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston, a direct injection fuel system and a spark ignition system, comprising:
  during engine cranking at cold start conditions operating said engine in a crank and fire start mode including:
    controlling said intake and exhaust valves to effect a full-lift, minimum valve overlap of no greater than about 40 crank angle degrees;
    controlling said fuel system to deliver one of a split and single injection of fuel during said compression stroke of said piston; and,
    controlling said spark ignition system to effect spark ignition;
  subsequent to operating said engine in said crank and fire start mode, operating said engine in a catalyst heating mode including:
    controlling said intake and exhaust valves to effect a full-lift, negative valve overlap in a range of about 0 to about 40 crank angle degrees;
    controlling said fuel system to deliver a first injection of fuel during said intake stroke of said piston and a second injection of fuel during said compression stroke of said piston; and,
    controlling said spark ignition system to effect retarded spark ignition; and,
  subsequent to operating said engine in said catalyst heating mode, operating said engine in a warm-up mode including:
    controlling said intake and exhaust valves to effect a partial-lift, negative valve overlap in a range of about 180 to about 200 crank angle degrees;
    controlling said fuel system to deliver a first injection of fuel during said negative valve overlap and a second injection of fuel during said compression stroke of said piston; and,
    controlling said spark ignition system to effect spark ignition.

17. The method of claim 16, wherein said operating said engine in said warm-up mode warms said engine sufficiently that subsequent engine operation is capable of homogeneous charge compression ignition operation without spark-assist.

18. The method of claim 16, wherein said controlling said spark ignition system to effect retarded spark ignition effects post top dead center ignition.

* * * * *